Figure 1:
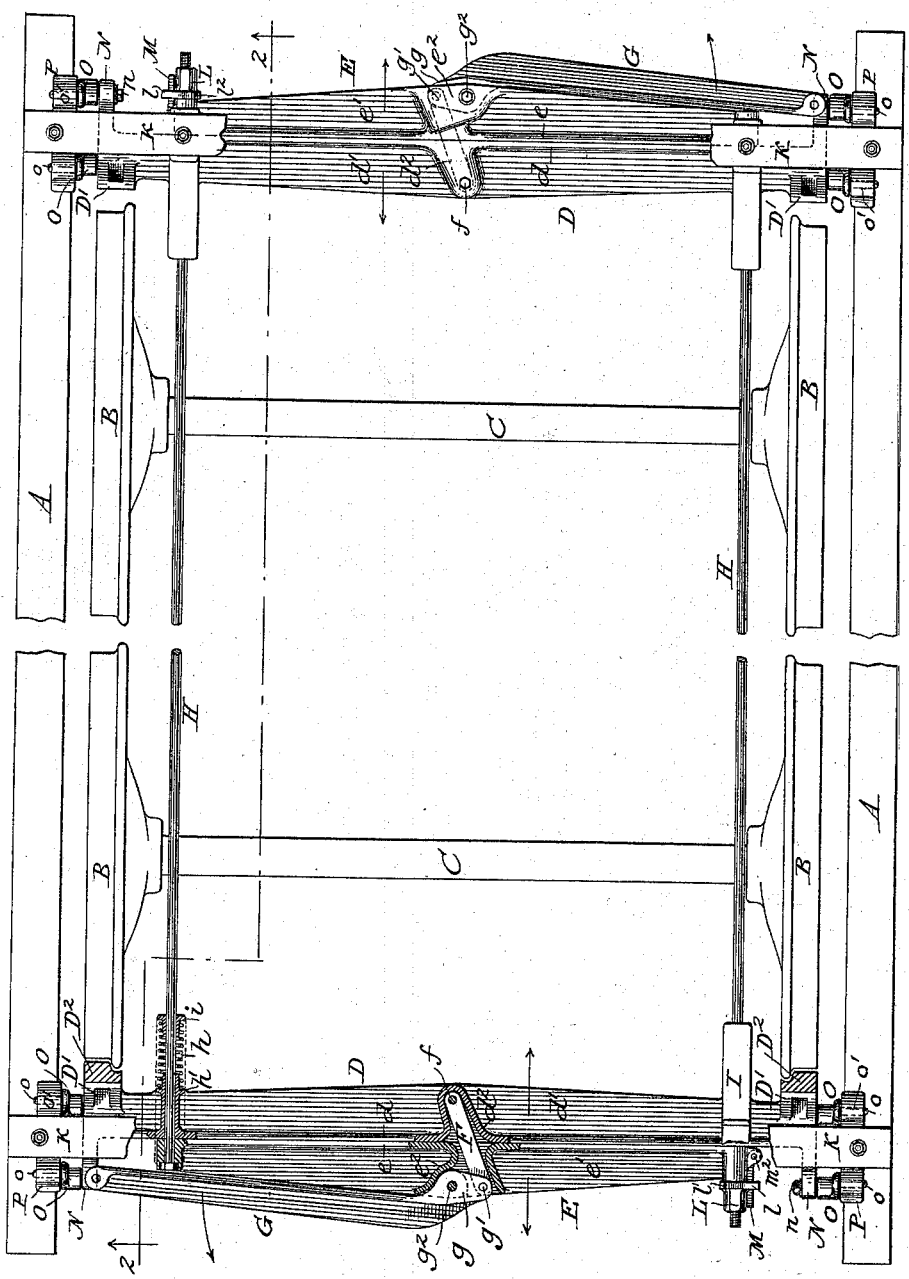

(No Model.) 2 Sheets—Sheet 1.

W. S. G. BAKER.
BRAKE FOR RAILWAY CARS.

No. 530,379. Patented Dec. 4, 1894.

Witnesses:
Sidney P. Hollingsworth
B. Washington Miller.

Inventor.
William S. G. Baker.
by his attorneys
Baldwin Davidson Wight (No Model.) 2 Sheets—Sheet 2.
W. S. G. BAKER.
BRAKE FOR RAILWAY CARS.
No. 530,379. Patented Dec. 4, 1894.
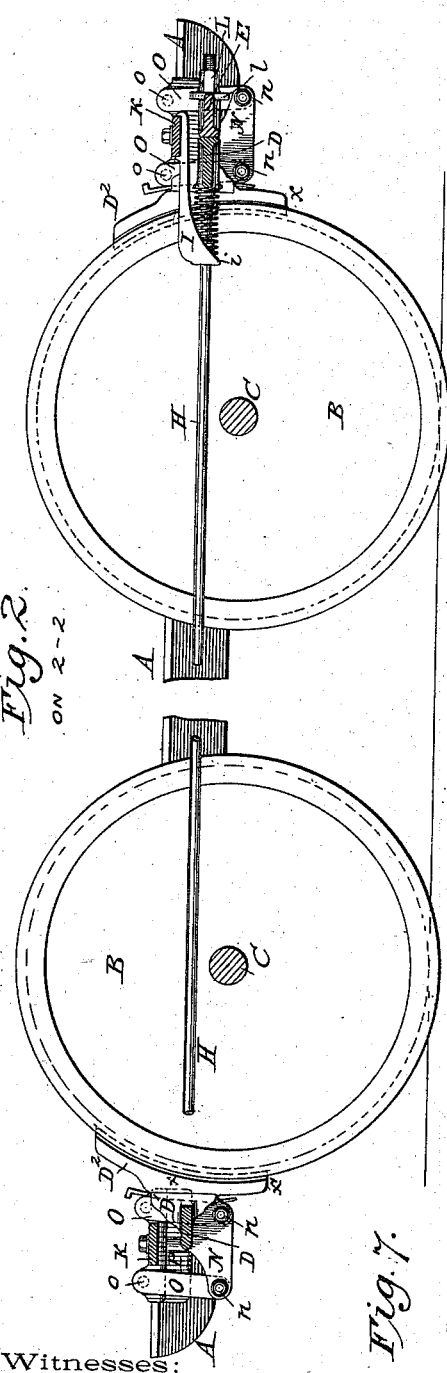
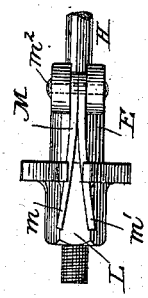
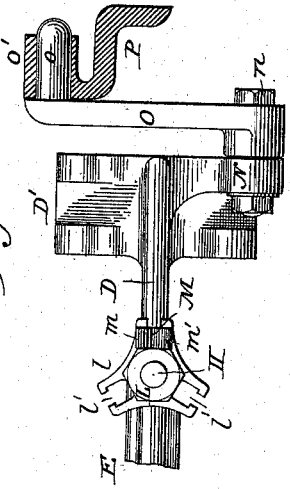
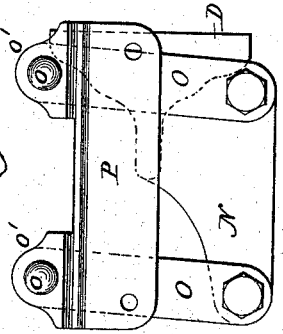
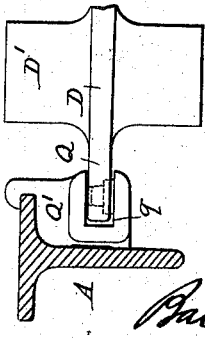
Witnesses:
Sidney P. Hollingsworth
W. Washington Miller
Inventor.
William S. G. Baker
by his attorneys
Baldwin Davidson & Wight

UNITED STATES PATENT OFFICE.

WILLIAM S. G. BAKER, OF BALTIMORE, MARYLAND.

BRAKE FOR RAILWAY-CARS.

SPECIFICATION forming part of Letters Patent No. 530,379, dated December 4, 1894.

Application filed March 26, 1894. Serial No. 505,144. (No model.)

*To all whom it may concern:*

Be it known that I, WILLIAM S. G. BAKER, a citizen of the United States, residing at Baltimore, in the State of Maryland, have invented certain new and useful Improvements in Car-Brakes, of which the following is a specification.

My invention especially relates to brake mechanism for electric motor cars, although the mechanism which I have invented may be adapted also for cars of other types.

In electric motor cars the brakes are in constant use, and there is great wear and strain on the moving parts. Great strength and power are required, and it is desirable that the brake mechanism should be as light as possible consistent with strength, power and durability.

Where the brake mechanism is composed of many parts bolted together, there is not only liability of the parts loosening and coming apart, but there is great wear on the bolts and the moving parts, and consequent noise and rattling when the parts get loose. It is also desirable in this class of motor cars, that the brake mechanism should not only be simple in construction and operation, but it should be attached to the truck in such manner that it may be easily removed therefrom, and the arrangements should be such that the wheels and axles may be readily removed without taking down the brake mechanism. It is also important that the brake mechanism should be so arranged as to present the brake shoes to the wheels in such manner that they shall bear upon the wheels uniformly in order that the pressure may be equal and the wear uniform.

According to my invention, I provide brake mechanism which is not only strong and powerful, but is durable, a minimum number of bolts and such like parts being employed, and the wear is consequently reduced.

I provide a brake beam at each end of the truck, and form it at each end with a brake head to which a brake shoe is detachably secured. An equalizing beam at each end of the truck is connected to the corresponding brake beam by a link, which is, in turn, connected to an operating lever.

The brake beams and equalizing beams are connected by longitudinal rods, which are provided with springs that are arranged to withdraw the brake shoes from the wheels when the brakes are released. The rods are arranged above the axles, and the brake beams and the equalizing beams and their operating levers are also arranged above the plane of the axles, the connections of the brake beams and equalizing beams with the operating levers being not only in the central line of the truck, but are also located centrally with reference to the beams and the brake heads.

In order that the brake shoes may move in straight lines toward and from the wheels, I connect the brake heads to the truck frame at each end of each brake beam by means of a pair of links pivotally connected with the truck frame at their upper ends by pivots arranged in the same horizontal plane, one behind the other.

In the accompanying drawings, Figure 1 is a plan view of a car truck embodying my improvements, with the central portion removed, and some of the parts broken away. Fig. 2 is a longitudinal section on the line 2—2 of Fig. 1. Fig. 3 is an end view of the brake mechanism. Figs. 4, 5 and 6 are on an enlarged scale. Fig. 4 is a detail view of one set of devices for supporting one end of a brake beam. Fig. 5 is a view illustrating particularly the manner of supporting the brake beam at one end on the truck frame. Fig. 6 is a detail view of the spring adjusting devices. Fig. 7 is a detail view of a modification.

The side beams A, of the truck frame may be supported on the wheels and axles B, C, in any approved way. These beams A, are preferably T-shaped in cross section, as illustrated in Fig. 3. At each end of the truck there is a brake beam D, which is formed integrally at each end with a brake head D', to which a brake shoe $D^2$ is detachably secured.

It will be observed that each brake head is secured to the brake beam without the use of bolts, being cast or formed integrally therewith.

Each brake beam D, has a corresponding equalizing beam E, which is somewhat shorter than the beam D, and is arranged on the outside thereof. Both beams D and E, are preferably formed with flat adjacent bearing surfaces $d\ e$, and with horizontal strengthening webs $d'\ e'$, and each beam is formed with a housing $d^2\ e^2$ to receive a connecting link F, and the enlarged end $g$ of an operating lever G. The link F, is connected by a pivot $f$ with the brake beam D, in the central line of the truck and it is connected with the operating lever G, by a pivot $g'$, at one side of the central line of the truck. The lever G, is connected by a pivot $g^2$ to the equalizing beam E, in line with the pivot $f'$. The arrangement at the opposite ends of the truck is the same, and the beams E and D at opposite ends are connected by tie rods H, which extend through bearings in both sets of beams D and E.

Each rod is provided at each end with a spring $h$, which bears against a seat $h'$, on a beam D, and against the overhanging end $i$, of a bracket I, which as shown particularly in Fig. 2, is secured to a cross bar K, of the truck frame. Four such springs are employed, one at each end of each rod, and each rod is provided at one end with an adjusting nut L, by means of which the tension of the spring is regulated. Each nut is preferably provided with a slotted or socketed head $l$, three slots or sockets $l'$, as shown in Fig. 5, preferably being employed to receive a locking bar M, of spring metal. This bar M, is composed of two spring members $m\ m'$, which are pivoted to the bearing formed on the beam E, at $m^2$, the arrangement being such that the members $m\ m'$ may be turned on their pivots to disengage from the head $l$, but when pinched together and inserted in one of the slots $l'$, the nut will be held firmly in position. By this arrangement, the tension of the springs may be correspondingly varied or regulated, and an equal movement and equal wear of the brake shoes insured.

Each brake head is formed with a bracket N, to which are pivotally connected by bolts $n$, a pair of links O, each of which is formed at its upper end with a stud $o$, which enters a bearing $o'$, in a bracket P, detachably secured to the side beam of the truck frame. The links are arranged one behind the other in the line of movement of the brake shoes. The upper pivots are in the same horizontal plane, and the lower pivots are in the same horizontal plane with reference to each other.

The pivots are arranged one behind the other, the distance between the top pivots of the links being equal to the distance between the bottom pivots of the links, and the pivots are held against a movement lengthwise of the links, the arrangement being such that when the brake mechanism is operated, the brake heads move in practically straight lines toward and from the wheels, thus insuring equal pressure at all times, and preventing crosswise movement, thereby insuring uniform wear.

The brake shoes are so formed that their centers $x$ are above the plane of the axles C, and the lower ends $x'$, of the brake shoes are so arranged that when the brakes are off, the wheels and axles may be removed without disturbing the brake mechanism, the car body, brake mechanism and truck frame being simply lifted vertically away from the wheels and axles.

While I prefer the mechanism before described for mounting the brake mechanism on the truck frame, so far as some features of my invention are concerned, this mechanism may be varied. For instance, as shown in Fig. 7, instead of employing the link connection, I may employ a sliding connection, the ends of the brake beams being extended at Q, and arranged to slide in recesses $q$, in brackets Q', secured to the side beams.

It will be understood that the levers G, are secured by chains or other suitable connections, with operating mechanism at the ends of the car. Fig. 1 shows the parts in their normal or inactive position. When one of the levers G, is operated, for instance that on the left-hand side of Fig. 1, the inner end or head of this lever is moved inwardly about its pivot $g^2$, causing the link F, to push the beam D, toward the adjacent wheels, thus applying the brake shoes to the wheels at this end. At the same time, the equalizing beam E, is caused to move away from the wheels, and through the medium of the tie rods H, the equalizing beam at the opposite end is caused to move toward the wheels at this end, and bearing against the adjacent brake beam, moves it toward the wheels, and applies the brake shoes thereto. The same operation occurs when the lever G at the right-hand end of the truck is operated. In each instance, it will be observed, the pivots $f'$ and $g^2$ are always arranged in and move in the central line of the truck, and consequently the equalizing beams E, and the brake beams D move in the same direction, and have no endwise movement. Therefore, the brake shoes are not moved transversely with reference to the truck, and thereby uniform pressure and equal wear on all the brake shoes are insured.

The link suspension of the brake mechanism on the truck frame co-operates with the lever connections at the center of the truck to insure the uniform action of the brake mechanism just described.

It will be observed that a very limited number of bolts is employed. No bolts are used for connecting the brake heads to the brake beams, and instead of employing bolts for connecting the links to the side beams of the truck studs are formed on the links, bolts being employed only at the lower ends of the links, these being necessary to afford a detachable connection. Only two bolts are therefore employed at each brake head, and only three bolts are used at the center of the truck for connecting the operating lever with the brake beam and equalizing beam. When it is desired to take down the brake mechanism, it may be readily done by simply detaching the bolts *n*.

I claim as my invention—

1. The combination with the wheels, axles and axle boxes, of a truck frame supported thereon, a brake beam, and an equalizing beam at each end of the truck, tie rods arranged above the axles and connecting the equalizing beams and extending through and supported on the brake beams, brake heads formed on the beams, and links pivotally connected to the side beams of the truck and to the brake heads.

2. In brake mechanism for car trucks, a brake beam formed substantially as hereinbefore set forth integrally with a flat, flanged body portion *d d'*, and with an enlarged brake head at each end in combination with an equalizing beam formed with a flanged body portion *e e'*, adapted to rest against the flat, flanged portion of the brake beam, substantially as described.

3. In brake mechanism for car trucks, the combination with the truck frame, of the wheels and axles, brake shoes on opposite sides of the truck for each pair of wheels, a brake beam connnecting and supporting each pair of brake shoes, and a pair of links pivotally connected to each brake head and which are of equal lengths between the upper and lower pivots, the pivots of each link being held against movement lengthwise relatively to the link.

4. The combination of the truck frame comprising side beams, and cross connecting beams, brackets detachably secured to the side beams, and a brake beam suspended from the frame by a pair of links at each end, which are of equal lengths between the upper and lower pivots, the pivots of each link being held against movement lengthwise relatively to the link.

5. The combination of a truck frame, a brake beam having an enlarged brake head at each end, and a pair of links arranged inside the truck frame and pivotally connected with the brake heads at each end and also pivotally connected with the truck frame by pivots arranged one behind the other.

6. The combination of a truck frame, a brake beam at each end of the truck, an equalizing beam at each end, tie rods connecting the opposite brake beams and equalizing beams, an operating lever at each end of the truck pivotally connected with the corresponding equalizing beam, and a link pivotally connected with the operating lever and with the corresponding brake beam.

7. The combination of a truck frame, a brake beam at each end thereof, an equalizing beam adjacent to each brake beam, an operating lever for each brake beam, a link connecting each operating lever with each brake beam, and pivots for the operating lever and the link arranged in the central line of the truck, substantially as set forth.

8. The combination with a brake beam and an equalizing beam of an operating lever, a housing formed in the brake beam and the equalizing beam, into which the end of the operating lever projects, and a link connecting the operating lever with the brake beam also arranged in this housing.

9. The combination of the truck frame having the cross bars K, the brake beams and equalizing beams at opposite ends of the truck, the tie rods connecting them, the springs arranged on the tie rods, the brackets secured to the cross bars of the truck, and connecting with the springs, and adjusting devices for varying the tension of the springs.

10. In a car truck, the combination of the brake beams, the tie rods, the springs, the nuts provided with radial slots or recesses, and the pivoted spring levers adapted to engage said recesses.

11. The combination of the truck frame, a brake beam, an equalizing beam, an operating lever pivoted in the central line of the truck to the equalizing beam, and connected by a link to the brake beam which is pivoted in the central line of the truck, and a pair of links at each end of the brake beam connecting it to the truck frame.

12. The combination of a brake beam, means for operating it, a pair of links at each end of the brake beam connected thereto by detachable bolts, brackets detachably secured to the side beams of the truck, and studs formed on the links which enter bearings in these brackets.

In testimony whereof I have hereunto subscribed my name.

WILLIAM S. G. BAKER.

Witnesses:
J. PAUL BAKER,
DANIEL W. POWELL.